A. C. GAYNOR.
CEILING AND FLOOR PLATE.
APPLICATION FILED NOV. 29, 1916.

1,229,061.

Patented June 5, 1917.

WITNESS
Chester F. Hayden.

INVENTOR
Arthur C. Gaynor
BY
Wooster V Bowersock
ATTORNEYS

UNITED STATES PATENT OFFICE.

ARTHUR C. GAYNOR, OF BRIDGEPORT, CONNECTICUT.

CEILING AND FLOOR PLATE.

1,229,061. Specification of Letters Patent. Patented June 5, 1917.

Application filed November 29, 1916. Serial No. 134,194.

*To all whom it may concern:*

Be it known that I, ARTHUR C. GAYNOR, a citizen of the United States, residing at Bridgeport, county of Fairfield, State of Connecticut, have invented an Improvement in Ceiling and Floor Plates, of which the following is a specification.

This invention relates to the manufacture of ornamental ceiling and floor plates which are used to impart a finish where steam, hot water and stove-pipes pass through floors and ceilings. These plates consist of semi-circular members which are provided with coöperating attaching means. Heretofore, so far as I am aware, the parts comprising the attaching means upon one or both of the members have been made separate from the members themselves, and have been attached to the members by a tongue and slot connection, or by riveting or soldering. This required a greatly increased number of operations and added materially to the cost of production, and furthermore, the members were not interchangeable but required to be matched up. That is to say, a plate could not be made up of any two members but each member was only operative when used in connection with a member provided with the coöperating portion of the attaching means.

My present invention therefore, has for its object the production of ceiling plates, each consisting of two interchangeable members, in which the parts of the attaching means shall be made integral with the members themselves and the members of which may be produced entirely by presswork, the operations of making the separate parts of the attaching means and riveting, soldering or otherwise securing said parts to the members, being eliminated. I am thus enabled to greatly reduce the cost of production and furthermore to produce very much neater and more attractive plates, as they are free from rivets and the members lie in close contact with but a line of demarcation between them.

Figure 1:
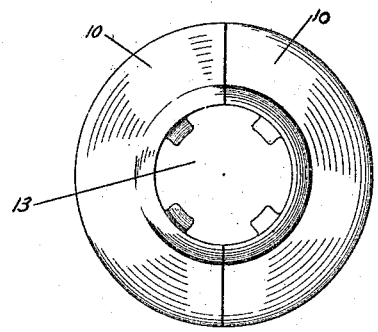
Figure 2:
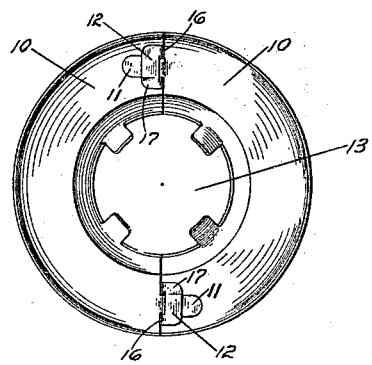
Figure 3:
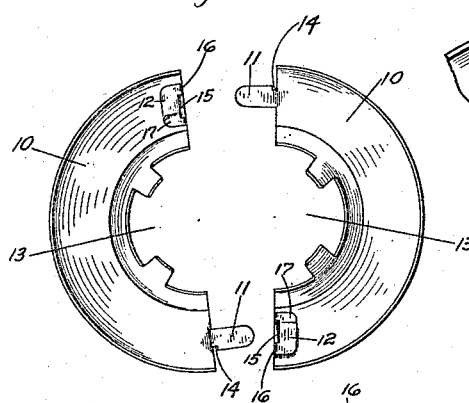
Figure 5:
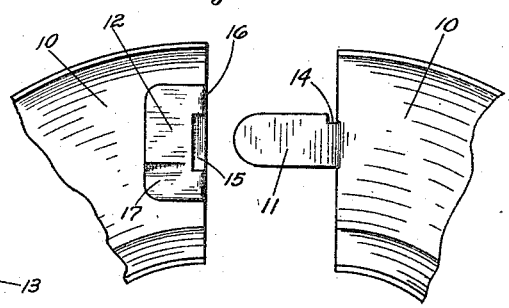
Figure 4:
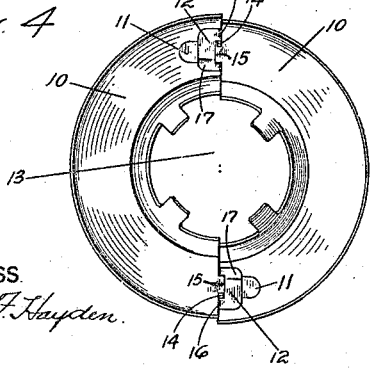
Figure 6:
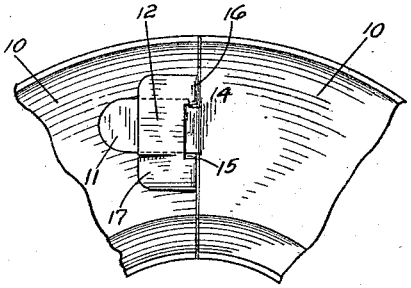

In the accompanying drawing forming a part of this specification,

Figure 1 is a plan view of my novel plate, the members being assembled, as in use;

Fig. 2 an inverted plan view, with the members assembled;

Fig. 3 an inverted plan view, with the members detached;

Fig. 4 an inverted plan view illustrating the operation of assembling the members;

Fig. 5 a detail plan view on a greatly enlarged scale, the members being detached; and Fig. 6 is a similar view, the members being assembled.

10 denotes the members or halves of a ceiling or floor plate, which are blanked out from sheet metal and may be given any ordinary or preferred configuration, and each of which is provided with a tongue 11 and a housing 12 formed integral therewith. Each member is provided with the usual semi-circular recess, said recesses together forming a central opening 13 in the plate to receive a pipe in the assembled position. The tongue of each member is located upon one side of this recess and the housing upon the other. As seen in plan, the tongue is off-set downward from the plane of the member, at its intersection with the member, just sufficiently to permit it to pass under the other member in assembling, leaving a shoulder in alinement with the edge of the member, and each tongue is provided on its outer side, contiguous to the edge of the member, with a locking notch 14. The housing is formed by leaving metal projecting from the edge of the member, which is folded over under the member leaving a space within the housing to just receive the tongue of another member, which is passed in through a slot 15 in the meeting edge of the housing. It will be noted (see Fig. 5) that each housing remains attached to the member by two curved strips of metal, the outer of which, specifically indicated by 16, forms a locking catch which coöperates with the locking notch in the tongue, to lock the members together as will be more fully explained. Each housing is provided at the edge opposite to the meeting edge with a spring formed by slitting the metal of the housing inward from the edge, and then springing the separated part inward from the plane of the housing. This spring yields when a tongue is passed into the housing, and in the fully assembled position, the edge of the spring coöperates with the edge of the tongue and yieldingly retains the tongue in such a position that the locking catch will remain in engagement with the locking notch.

The mode of assembling the members to form a complete ring will be readily understood from Figs. 3 and 4. The members are placed on opposite sides of the pipe to be inclosed and moved toward each other, the tongues being passed into the slots in the housings. These slots are made just long enough to receive the tongues, and the slits which separate the springs from the bodies of the housings are at a distance inward from the contiguous ends of the slots corresponding approximately with the depth of the locking notches in the tongues. It follows, therefore, that as the tongues are passed into the housings, the springs will be raised by the tongues and the members will lie with their meeting edges in contact, but out of registration with each other, as clearly shown in Fig. 4. The assembling operation is completed by moving the members laterally, relatively to each other, from the position shown in Fig. 4, to that shown in Fig. 2. The locking catches upon the housings will now engage the locking notches in the tongues and the springs will snap down partly below the back edges of the tongues, so that the edges of the tongues will abut against the edges of the springs and thus yieldingly retain the members in the locked position.

To separate the members, they are moved laterally relatively to each other, from the position shown in Fig. 2 to that shown in Fig. 4, when they may be readily separated as indicated in Fig. 3, the edges of the tongues passing under the edges of the springs and lifting them slightly. This requires, as already stated, that the springs be pressed inward but slightly from the plane of the housings. In case it is preferred, however, that the plates should not be removable, but be rigidly locked in place when once assembled about a pipe, it is simply necessary to press the springs inward a greater distance from the plane of the housings. The operation of assembling will be the same as before, but after the members have been moved from the position shown in Fig. 4, to that shown in Fig. 2, the springs will snap down below the back edges of the tongues far enough to rigidly hold the tongues in such a position, that the locking catches of the housings will be rigidly locked in the locking notches in the tongues.

Having thus described my invention, I claim:—

1. A plate of the character described, comprising members each having a semi-circular recess, upon one side of said recess a tongue having a locking notch, and upon the other side of said recess a housing having a slot in its meeting edge to receive a tongue, leaving attaching strips on opposite sides of the slot, one of said strips forming a locking catch to coöperate with the locking notch, and each housing being provided with a spring which is raised by a tongue leaving the meeting edges of the members in contact but out of registration, the assembling being completed by moving the members laterally relatively to each other, in which position the locking catches engage the locking notches, and the springs snap down back of the edges of the tongues to retain the members in the locked position.

2. A plate of the character described, comprising members each having a semi-circular recess, upon one side of said recess a tongue having a locking notch, and upon the other side of said recess a housing having a slot in its meeting edge to receive a tongue, leaving attaching strips on opposite sides of the slot, one of said strips forming a locking catch to coöperate with the locking notch, and each housing being provided with a spring formed by slitting the metal of the housing inward from the free edge and then springing the separated parts inward toward the plate, the springs being raised by the tongues, leaving the meeting edges of the members in contact but out of registration, the asembling being completed by moving the members laterally into registration in which position the locking catches engage the locking notches and the springs snap down back of the edges of the tongues and yieldingly retain the members in the locked position.

3. A plate member of the character described having a semi-circular recess, upon one side of said recess a tongue having a locking notch, and upon the other side of said recess a housing having a slot in its meeting edge to receive the tongue of another member leaving attaching strips on opposite sides of the slot, one of said strips forming a locking catch to coöperate with the locking notch and said housing being provided with a spring which is raised when a tongue is passed into the housing.

4. A symmetrical plate of the character described comprising identical semi-circular halves, each having an integral off-set tongue projecting from one of the edges thereof to be joined to the edge of the counterpart half and a housing on its corresponding opposite edge, said housing comprising an integral flap folded rearwardly from the edge from which it projects and being slotted at said edge to receive the tongue on said other half, said tongue being provided with a locking notch in the edge thereof adapted to be sprung laterally into engagement with the end of the slot in said housing when said tongue is seated in said housing, and said housing further including an off-set portion engaging the tongue in said housing to yieldingly retain said tongue and said housing in locking engagement.

In testimony whereof I affix my signature.

ARTHUR C. GAYNOR.

Copies of this patent may be obtained for five cents each, by addressing the "Commissioner of Patents, Washington, D. C."